United States Patent
Zheng et al.

(10) Patent No.: US 10,923,707 B2
(45) Date of Patent: Feb. 16, 2021

(54) DRY PROCESS METHOD FOR PRODUCING ELECTRODES FOR ELECTROCHEMICAL DEVICES AND ELECTRODES FOR ELECTROCHEMICAL DEVICES

(71) Applicant: FLORIDA STATE UNIVERSITY RESEARCH FOUNDATION, INC., Tallahassee, FL (US)

(72) Inventors: Jian-ping Zheng, Tallahassee, FL (US); Qiang Wu, Tallahassee, FL (US)

(73) Assignee: FLORIDA STATE UNIVERSITY RESEARCH FOUNDATION, INC., Tallahassee, FL (US)

(*) Notice: Subject to any disclaimer, the term of this patent is extended or adjusted under 35 U.S.C. 154(b) by 398 days.

(21) Appl. No.: 15/738,863

(22) PCT Filed: Jun. 27, 2016

(86) PCT No.: PCT/US2016/039575
§ 371 (c)(1),
(2) Date: Dec. 21, 2017

(87) PCT Pub. No.: WO2016/210419
PCT Pub. Date: Dec. 29, 2016

(65) Prior Publication Data
US 2018/0175366 A1    Jun. 21, 2018

Related U.S. Application Data

(60) Provisional application No. 62/251,348, filed on Nov. 5, 2015, provisional application No. 62/185,006, filed on Jun. 26, 2015.

(51) Int. Cl.
| | |
|---|---|
| H01M 4/04 | (2006.01) |
| H01M 10/0525 | (2010.01) |
| H01M 4/62 | (2006.01) |
| H01M 4/36 | (2006.01) |
| H01M 4/139 | (2010.01) |
| H01M 4/1395 | (2010.01) |
| H01M 4/1393 | (2010.01) |
| H01M 4/1391 | (2010.01) |
| H01M 4/131 | (2010.01) |
| H01M 4/02 | (2006.01) |

(52) U.S. Cl.
CPC ......... *H01M 4/0435* (2013.01); *H01M 4/043* (2013.01); *H01M 4/0404* (2013.01); *H01M 4/131* (2013.01); *H01M 4/139* (2013.01); *H01M 4/1391* (2013.01); *H01M 4/1393* (2013.01); *H01M 4/1395* (2013.01); *H01M 4/366* (2013.01); *H01M 4/622* (2013.01); *H01M 4/623* (2013.01); *H01M 4/624* (2013.01); *H01M 4/625* (2013.01); *H01M 10/0525* (2013.01); *H01M 2004/021* (2013.01); *Y02E 60/10* (2013.01)

(58) Field of Classification Search
CPC .......................................... H01M 4/043–40435
See application file for complete search history.

(56) References Cited

U.S. PATENT DOCUMENTS

| | | | |
|---|---|---|---|
| 8,815,443 B2* | 8/2014 | Mitchell | H01M 4/623 |
| | | | 429/209 |
| 2006/0137157 A1 | 6/2006 | Itagawa et al. | |
| 2012/0225199 A1 | 9/2012 | Muthu et al. | |
| 2014/0030590 A1 | 1/2014 | Wang et al. | |
| 2014/0238576 A1 | 8/2014 | Zhong | |
| 2014/0377611 A1 | 12/2014 | Kwon et al. | |

OTHER PUBLICATIONS

International Search Report dated Oct. 28, 2016 in PCT/US16/39757.

* cited by examiner

*Primary Examiner* — Jonathan Crepeau
(74) *Attorney, Agent, or Firm* — Fox Rothschild LLP

(57) ABSTRACT

A method of making an electrode for an electrochemical cell includes the step of providing an electrode composite comprising from 70-98% active material, from 0-10% conductive material additives, and from 2-20% polymer binder, based on the total weight of the electrode composite. The electrode composite is mixed and then compressed the electrode composite into an electrode composite sheet. The electrode composite sheet is applied to a current collector with pressure to form an electrode, wherein the electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The binder can be a single nonfluoropolymer binder. Dry process electrodes are also disclosed.

21 Claims, No Drawings

DRY PROCESS METHOD FOR PRODUCING ELECTRODES FOR ELECTROCHEMICAL DEVICES AND ELECTRODES FOR ELECTROCHEMICAL DEVICES

CROSS-REFERENCE TO RELATED APPLICATIONS

This Application is a § 371 national stage entry of International Application No. PCT/US2016/039575, filed Jun. 27, 2016, which claims priority to U.S. Provisional Application No. 62/185,006 filed Jun. 26, 2015, entitled "NONFLUOROPOLYMER BINDER COMPOSITION AND METHOD FOR PRODUCING COMPOSITE POWDER FOR DRY PROCESS ELECTRODE FOR ELECTROCHEMICAL DEVICES AND METHOD FOR PRODUCING ELECTRODE FOR ELECTROCHEMICAL DEVICES" and to U.S. Provisional Application No. 62/251,348 filed Nov. 5, 2015, entitled "ELECTRODE COMPOSITES AND METHOD FOR PRODUCING ELECTRODE THROUGH DRY PROCESS FOR A LITHIUM-ION BATTERY USING THE SAME" the entireties of which are all hereby incorporated herein by reference.

FIELD OF THE INVENTION

The present invention is directed to electrodes for an energy storage device or an energy storage system, and more particularly to electrodes for energy storage devices including but not limited to ultracapacitors, lithium ion capacitors, batteries, fuel cells, and hybrid cells which are the combination of the above devices.

BACKGROUND OF THE INVENTION

A lithium-ion battery (sometimes Li-ion battery or LIB) is a rechargeable battery in which lithium ions move from the negative electrode (anode) to the positive electrode (cathode) during discharge and back when charging. As an electrolyte, a compound solvent consisting of cyclic carbonates and linear carbonates has been used, to which lithium hexafluoro phosphate ($LiPF_6$) or lithium tetrafluoroboronate ($LiBF_4$) has been added as a supporting electrolyte.

Typically electrodes are constructed by applying active material onto a current collector in the presence of a binder that affords cohesion between the active materials and adhesion to the current collector. The binder is commonly combined with carbon black for electric conductivity. Common active materials for the anode is carbon (graphite) or silicon, and for the cathode, lithium metal oxides, mixed metal oxides, or metal salts of usually lithium. The current collector for the anode is typically Cu, and for the cathode is typically Al. The electrolyte can be a mixture of organic carbonates containing lithium salts. The organic carbonates can include ethylene carbonate, ethyl methyl carbonate, diethyl carbonate, or combinations thereof. The lithium salts can include $LiPF_6$, $LiAsF_6$, $LiClO_4$, $LiCF_3SO_3$, $LiN(SO_2CF_3)_2$ or combinations thereof. The separator is commonly made from a stretched and thus micro-porous multi-layered film of polyethylene, polypropylene or combinations thereof.

Accordingly, when the lithium-ion secondary battery is charged, lithium ions deintercalated from the positive electrode are inserted into the carbon or graphite of the negative electrode. During discharge of the lithium-ion secondary battery, lithium ions are deintercalated from the carbon or graphite and are inserted into the lithium transition metal oxide of the positive electrode.

The performance of the battery mostly depends on the kinds of active materials used, and on the kinds of binder contained in the electrodes. For example, the cycle life, high capacity, and low temperature characteristics of a battery depend on the types of binders. In an ideal electrode composition, the binder not only has to provide the mechanical binding among the active material particles, but also has to allow for ion transport to the active material from the electrolyte. Therefore, binders are dual functioning and provide mechanical binding and ion transport, and the amount of binder has to be adjusted to reach a compromise. In some respects, the cell energy, power, and life can be traced back to the binder.

Widely used binders comprise homopolymers and copolymers of polyvinylidene fluoride (PVDF), which have gained success as binders for cathodes and anodes in lithium ion battery technology. PVDF and copolymers such as p(VDF-HFP) (copolymer of vinylidene fluoride and hexafluoropropylene) with high chemical stability and with strong electron-withdrawing functional groups (—C—F—) to induce a net dipole moment are desirable as the most common polymer binders in LIBs. Also, the high dielectric constant (~8.4) of PVDF supports a high concentration of charge carriers. PVDF on its own does not conduct lithium ions, and to allow for the transport of ions, PVDF swells with the absorption of the electrolyte. The PVDF binding force to the lithium ion electrode active materials and to the current collector is low. In addition, the swelling of PVDF in an electrolyte solution further compromises the PVDF binding force to the active materials. As a result of the swelling, its binding properties diminish significantly.

In addition to PVDF, polyolefinic materials with electron withdrawing substituents such as poly(methyl methacrylate) (PMMA), polyacrylic acids, polyacrylronitrile (PAN) and polyvinyl chloride (PVC) have been adopted in lithium ion battery technology. Functionalized copolymers provide performance qualities that can be utilized as a binder material for lithium ion batteries, such as robust adhesion to the current collector, stronger binding, suitable swelling in electrolytes, higher active material loading, excellent flexibility and a comparable operating (redox/thermal) window.

Lithium ion batteries are manufactured in sets of electrodes and then assembled in cells. In a typical coating or slurry casting procedure, a solvent or an aqueous solution is used to dissolve binders or binder suspension, followed by mixing the binder solutions with active electrode materials and conductive additives to form a slurry. The slurry is then coated/casted onto a current collector, such as copper foil and aluminum foil, in a coating machine. The current collector along with the coating layer is passed through a long dryer, where the solvent is dried and removed from the electrode. Upon drying, the electrode layer may be roll-pressed or "calendered" to produce an electrode of desired thickness and tap density.

Currently, electrodes for lithium ion based energy storage batteries (LIB) and supercapacitors are often made with the above-described coating or slurry casting procedure (wet method). The problems associated with the wet method are that: (1) a large amount of energy is consumed to remove the solvent; (2) there is always a residue from the solvent in the coated electrode, which may reduce the life of cells; (3) the dissolved binder coated on the active material surfaces increases the cell resistivity, thus resulting in reduced device energy and power densities; and (4) the electrode tap density is low because the pressure used in the final roll-press is limited to prevent the wrinkles in the current collectors. The low tap density results in low energy density, high resistance, and poor cycle life.

A dry method has been developed for fabricating activated carbon electrodes for use in supercapacitors and is disclosed in Zhong US Pat Pub No. 20140238576 A1. The powders are dry mixed and subjected to an extensive mixing, where the binder is fiberized forming a matrix to support other particles to form an electrode film. The dry process solves many of the above-noted problems associated with the wet method. However, the problems associated with this dry method are: (1) the most commonly used binder in this dry process for both supercapacitors and LIBs is polytetrafluoroethylene (PTFE). The PTFE is not electrochemically stabile because of the reaction between the fluorine and Li metal or Li ions, which causes concentrated heat evolution and capacity reduction of the LIBs.

In Wang et al U.S. Patent Application Pub. 20140030590 A1, a solvent-free process based graphene electrode for energy storage devices was proposed. Compared to the above dry process, nonfluoropolymer binders were used in the solvent-free based graphene electrode, such as carboxymethyl cellulose (CMC), styrene butadiene rubber (SBR), polyvinyl chloride (PVC), and polyethylene (PE) and others. The problems associated with this dry method are that, to form a self-supporting layer, a porous conductive framework is used to support dry graphene sheets and dry binder particles. These porous conductive frameworks are nonfunctional materials, do not add any capacitance or energy to the electrode, which can cause lower packing density and thus reduce the energy and powder density of the electrodes. The references cited herein are incorporated fully by reference.

SUMMARY OF THE INVENTION

A method of making an electrode for an electrochemical cell includes the step of providing an electrode composite comprising from 70-98% active material, from 0-10% conductive material additives, and from 2-20% polymer binder, based on the total weight of the electrode composite. The electrode composite is mixed and then compressed into an electrode composite sheet. The electrode composite sheet is applied to a current collector with pressure to form an electrode, wherein the electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The binder can be a single nonfluoropolymer binder. The active material can comprise at least 80% by weight of the electrode composite.

The active material can be a positive electrode active material comprising at least one selected from the group consisting of $LiCoO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, where $0<x<0.8$, $LiMn_2O_4$, $LiFePO_4$, $Li_2Mn_2O_4$, $LiNiCoAlO_2$, $LiNi_yCo_xM_zO$, where M=Mn, Al, Sn, In, Ga or Ti and $0.15<x<0.5$, $0.5<y<0.8$ and $0<z<0.15$, $Li[Li_{(1-2y)/3}Ni_y Mn_{(2-y)/3}]O_2$, $Li[Li_{(1-y)/3}Co_y Mn_{(2-2y)/3}]O_2$ and $Li[Ni_y Co_{1-2y}Mn_y]O_2$, $0<y<0.5$, $LiNiCoO_2 \cdot MnO_2$, lithium rich compounds $Li_{1+y}(Ni_{1/3}Co_{1/3}Mn_{1/3})_{1-y}O_2$, where $y=x/(2+x)$ and $x=0-0.33$, and $xLi_2MnO_3(1-x)Li(NiCoMn)O_2$ and $Li_{(1+y)}(Ni_{0.5}Co_{0.2}Mn_{0.3})_{1-y}O_2$, where $y=x/(2+x)$ and $x=0-0.33$, and $LiMPO_4$, where M is at least one selected from the group consisting of V, Cr, Mn, Fe, Co, and Ni.

The active material can be an anode active material comprising at least one selected from the group consisting of carbon, hard carbon, soft carbon, synthetic graphite, natural graphite, mesophase carbon microbeads, $SnO_2$, SnO, $TiO_2$, $Li_4Ti_5O_{12}$, $LiTi_2O_4$, $SiO_2$ and silicon.

The conductive material additive can comprise at least one selected from the group consisting of carbon black, acetylene black, carbon nanotube, carbon nanofiber, carbon fibers, coke, high surface area carbon, graphite, metal particles, and conducting polymer.

The binder material can be a soft polymer comprising at least one selected from the group consisting of acrylic-based soft polymers, isobutylene-based soft polymers, diene-based soft polymers, silicon-containing soft polymers, olefin-based soft polymers, vinyl-based soft polymers, epoxy-based soft polymers, fluorine-containing soft polymers, natural rubbers, polypeptides, proteins, polyester-based thermoplastic elastomers, vinyl chloride-based thermoplastic elastomers, and polyamide-based thermoplastic elastomers.

The binder material can be a soft polymer comprising at least one selected from the group consisting of homopolymers or copolymers of acrylic acid or methacrylic acid derivatives, polybutyl acrylate, polybutyl methacrylate, polyhydroxyethyl methacrylate, polyacrylamide, polyacrylonitrile, butyl acrylate-styrene copolymers, butyl acrylate-acrylonitrile copolymers, butyl acrylate-acrylonitrile-glycidyl methacrylate copolymers, polyisobutylene, isobutylene-isoprene rubber, isobutylene-styrene copolymers, polybutadiene, polyisoprene, butadiene-styrene random copolymers, isoprene-styrene random copolymers, acrylonitrile-butadiene copolymers, acrylonitrile-butadiene-styrene copolymers, butadiene-styrene-block copolymers, styrene-butadiene-styrene-block copolymers, isoprene-styrene-block copolymers, styrene-isoprene-styrene-block copolymers, dimethylpolysiloxane, diphenylpolysiloxane, dihydroxypolysiloxane, liquid polyethylene, polypropylene, poly-1-butene, ethylene-α-olefin copolymers, propylene-α-olefin copolymers, ethylene-propylene-diene copolymers (EPDM), ethylene-propylene-styrene copolymers, polyvinyl alcohol, polyvinyl acetate, polyvinyl stearate, vinyl acetate-styrene copolymers, polyethylene oxide, polypropylene oxide, epichlorohydrin rubbers, vinylidene fluoride-based rubbers, tetrafluoroethylene-propylene rubbers, poly(2-methoxyethoxyethoxyethylene), styrene butadiene rubber (SBR), butadiene-acrylonitrile, rubber (NBR), hydrogenated NBR (HNBR), epichlorhydrin rubber (CHR) and acrylate rubber (ACM).

The binder material can comprise a soft polymer comprising at least one selected from the group consisting of soft polymers having a crosslinked structure, and soft polymers having a functional group in the range of about 3-12% by weight of the soft polymer, wherein the functional group is at least one selected from the group consisting of an unsaturated group, a carboxyl group, a hydroxy group, an amino group, and an epoxy group.

The mixing step can comprise at least one selected from the group consisting of rubber kneading, two roll milling, tumbling mixing, air jet mixing, mixture grinding, high-shear mixing, V-blender mixing, mixing by a screw-driven mass mixer, double-cone mixing, drum mixing, conical mixing, two-dimensional mixing, double Z-arm blending, ball-milling, and fluidized-bed blending.

The mixing step can further comprise the step of providing a solvent and mixing the solvent with the binder at a binder to solvent ratio of from 100:1 to 1:100 by weight, and adding the active material particles and carbonaceous conductors to binder solution in a ratio of from 10:1 to 1:10, by weight. The solvent can comprise at least one selected from the group consisting of a hydrocarbon, ketone, naphtha, acetate, acrylonitrile, toluene, xylene, alcohol, or esters.

The electrode composite sheet can have a thickness of less than 200 microns. The electrode composite sheet can have a thickness of from 50-150 microns. The electrode composite sheet can comprise less than 50% solvent, by weight of the electrode composite sheet.

The binder material can comprise at least two binder materials. The method can further comprising the step of forming a binder coating of a Li ion transporting material on the surface of the active materials. The binder materials can comprise at least one selected from the group consisting of homopolymers and copolymers of polyvinylidenefluoride (PVDF), polyolefinic materials with electron withdrawing substituents, and water soluble binders.

The binders can comprise at least one selected from the group consisting of copolymers of vinylidene fluoride and hexafluoropropylene, poly(methyl methacrylate) (PMMA), polyacrylic acids, polyacrylronitrile (PAN), polyvinyl chloride (PVC), poly vinylalcohols (PVA), polyvinyl pyrrolidone, polyethylene oxides (PEO), polyethylene glycols, polyacrylamide (PAAm), poly-N-isopropylearylamide, poly-N,N-dimethylacrylamide, polyethyleneimine, polyoxyethylene, polyvinylsulfonic acid, polyactic acid (PLA), polyacrylic acid (PAA), polysuccinic acid, poly maleic acid and anhydride, poly furoic(pyromucic acid), poly fumaric acid, poly sorbic acid, poly linoleic acid, poly linolenic acid, poly glutamic acid, poly methacrylic acid, poly licanic acid, poly glycolic acid, polyaspartic acid, poly amic acid, poly formic acid, poly acetic acid, poly propionic acid, poly butyric acid, poly sebacic acid, acrylic acid-type water-soluble polymers, maleicanhydride-type water-soluble polymers, poly(N-vinyl amides), polyacrylamides, N-methyl-acrylamide, N-ethyl acrylamide, N,N-dimethyl acrylamide, and N,Ndiethylacrylamide, poly(hydroxy-ethyl methacrylate), polyesters, poly(ethyl oxazolines), poly(oxymethylene), poly(vinyl methyl ether), poly(styrene sulfonic acid), poly(ethylenesulfonic acid), poly(vinyl phosphoric) acid, poly(maleic acid), starch, cellulose, protein, polysaccharide, dextrans, tannin, lignin, polyethylene-polypropylene copolymer, copolymers of poly(acrylonitrile-co-acrylamide), co-polymer of polystyrenebutadiene rubber and poly(acrylonitrile-co-acrylamide), or mixtures or co-polymers thereof, carboxymethyl cellulose (CMC), poly vinylalcohols (PVA), polyacrylic acids (PAA), polystyrenebutadiene rubber (SBR), PEO, or co-polymers of polyacrylonitrile, polyethylene oxides (PEO) and polyacrylamide (PAAm), poly vinylalcohols (PVA) and polyacrylamide (PAAm), or PEO and polyacrylronitrile (PAN), or co-polymers or mixtures thereof.

The second binder material can be a soft polymer comprising at least one selected from the group consisting of homopolymers or copolymers of acrylic acid or methacrylic acid derivatives, polybutyl acrylate, polybutyl methacrylate, polyhydroxyethyl methacrylate, polyacrylamide, polyacrylonitrile, butyl acrylate-styrene copolymers, butyl acrylate-acrylonitrile copolymers, butyl acrylate-acrylonitrile-glycidyl methacrylate copolymers, polyisobutylene, isobutylene-isoprene rubber, isobutylene-styrene copolymers, polybutadiene, polyisoprene, butadiene-styrene random copolymers, isoprene-styrene random copolymers, acrylonitrile-butadiene copolymers, acrylonitrile-butadiene-styrene copolymers, butadiene-styrene-block copolymers, styrene-butadiene-styrene-block copolymers, isoprene-styrene-block copolymers, styrene-isoprene-styrene-block copolymers, dimethylpolysiloxane, diphenylpolysiloxane, dihydroxypolysiloxane, liquid polyethylene, polypropylene, poly-1-butene, ethylene-α-olefin copolymers, propylene-α-olefin copolymers, ethylene-propylene-diene copolymers (EPDM), ethylene-propylene-styrene copolymers, polyvinyl alcohol, polyvinyl acetate, polyvinyl stearate, vinyl acetate-styrene copolymers, polyethylene oxide, polypropylene oxide, epichlorohydrin rubbers, vinylidene fluoride-based rubbers, tetrafluoroethylene-propylene rubbers, poly(2-methoxyethoxyethoxyethylene), styrene butadiene rubber (SBR), butadiene-acrylonitrile, rubber (NBR), hydrogenated NBR (HNBR), epichlorhydrin rubber (CHR) and acrylate rubber (ACM).

The compressing step can include passing the electrode composite through a pair of opposing rollers. The electrode composite sheet can be passed through a plurality of pairs of rollers, the spacing between the rollers decreasing for each subsequent pair of rollers.

A binder system for the fabrication of an electrode comprising active materials and a current collector can include a first lithium ion transporting polymeric coating binder material coating the active materials to produce a first binder coated active material composite. A second polymeric binder material binds the coated first binder coated active material composites together and to the current collector. The electrode when formed possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The ratio of the first polymeric coating binder material to the second polymeric binder material can be between 1:20 and 20:1 by weight.

An electrode can include electrode active materials and a first lithium ion transporting polymeric binder material for coating the active materials to produce a first binder coated active material composite. A second polymeric binder material binds the first binder coated active material composites together and to the current collector. The electrode when formed possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test.

An electrode can include a current collector and an electrode composite comprising from 70-98% active material, from 0-10% conductive material additives, and from 2-20% polymer binder, based on the total weight of the electrode composite. The electrode composite can be formed into an electrode composite sheet. The electrode composite sheet can be adhered to the current collector to form the electrode, wherein the electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The polymer binder can be a single nonfluoropolymer binder.

A process for making an electrode can include the step of coating electrode active materials with a first lithium ion transporting polymeric coating binder material to produce a first binder coated active material composite. The coated electrode active materials can be mixed with a second polymeric binder material for binding the first binder coated active material composite together and to a current collector. The electrode composite can be compressed into an electrode composite sheet. The electrode composite sheet can be applied to a current collector with pressure to form an electrode, wherein the electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test.

DETAILED DESCRIPTION OF THE INVENTION

A method of making an electrode for an electrochemical cell includes the step of providing an electrode composite comprising from 70-98% active material, from 0-10% conductive material additives, and from 2-20% polymer binder, based on the total weight of the electrode composite. The electrode composite is mixed and then compressed into an electrode composite sheet. The electrode composite sheet is applied to a current collector with pressure to form an electrode. The electrode possesses positive characteristics for adhesion according to ASTM standard test D3359-09e2, entitled Standard Test Methods for Measuring Adhesion by Tape Test. The electrode composite sheet and the electrode possess positive characteristics for flexibility according to the Mandrel Test. The binder can be a single nonfluoropolymer binder.

The active material can comprise at least 80% by weight of the electrode composite. The positive electrode active material can comprise from 80-95% by weight of the electrode composite.

The active material can be a positive electrode active material comprising at least one selected from the group consisting of $LiCoO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co^{1/3}Mn_{1/3}O_2$, where $0<x<0.8$, $LiMn_2O_4$, $LiFePO_4$ which can be coated with at least one of graphite and carbon, $Li_2Mn_2O_4$, $LiNiCoAlO_2$, $LiNi_yCo_xM_zO$, where M=Mn, Al, Sn, In, Ga or Ti and $0.15<x<0.5$, $0.5<y<0.8$ and $0<z<0.15$, $Li[Li_{(1-2y)/3}Ni_y Mn_{(2-y)/3}]O_2$, $Li[Li_{(1-y)/3}Co_yMn_{(2-2y)/3}]O_2$ and $Li[Ni_y Co_{1-2y}Mn_y]O_2$, $0<y<0.5$, $LiNiCoO_2.MnO_2$, lithium rich compounds such as $Li_{1+y}(Ni_{1/3}Co_{1/3}Mn_{1/3})_{1-y}O_2$, where $y=x/(2+x)$ and $x=0-0.33$, and $xLi_2MnO_3(1-x)Li(NiCoMn)O_2$ and $Li_{(1+y)}(Ni_{0.5}Co_{0.2}Mn_{0.3})_{1-y}O_2$, where $y=x/(2+x)$ and $x=0-0.33$, and $LiMPO_4$, where M is at least one selected from the group consisting of V, Cr, Mn, Fe, Co, and Ni. Other positive electrode active materials are possible.

The active material can be an anode active material comprising at least one selected from the group consisting of carbon, hard carbon, soft carbon, synthetic graphite, natural graphite, mesophase carbon microbeads, metal oxides such as $SnO_2$, $SnO$, $TiO_2$, lithium titanates such as $Li_4Ti_5O_{12}$, $LiTi_2O_4$, $SiO_2$ and silicon. Other anode active materials are possible.

The conductive material additive can comprise at least one selected from the group consisting of carbon black, acetylene black, carbon nanotube, carbon nanofiber, carbon fibers, coke, high surface area carbon, graphite, metal particles, and conducting polymer. Other conductive material additives are possible.

Preferred binders for the invention should possess: 1) good electrochemical stability; 2) enough flexibility and mechanical tension for continuous rolling during electrode fabrication; 3) good mechanical adhesion both to the electrode active material and the current collector; 4) good ionic conductivity of the binder polymer. Soft polymers with low glass transition temperature (Tg) of under 25° C. such as rubber and elastomers are good candidates as binders for this purpose, including bulk rubber or elastomer and their latex suspension.

The binder material can be a soft polymer comprising at least one selected from the group consisting of acrylic-based soft polymers, isobutylene-based soft polymers, diene-based soft polymers, silicon-containing soft polymers, olefin-based soft polymers, vinyl-based soft polymers, epoxy-based soft polymers, fluorine-containing soft polymers, natural rubbers, polypeptides, proteins, polyester-based thermoplastic elastomers, vinyl chloride-based thermoplastic elastomers, and polyamide-based thermoplastic elastomers. Other binder materials are possible.

Examples of specific binder materials that can be used include at least one selected from the group consisting of acrylic-based soft polymers that are homopolymers or copolymers of acrylic acid or methacrylic acid derivatives, or copolymers with monomers that can be copolymerized with the homopolymers, such as polybutyl acrylate, polybutyl methacrylate, polyhydroxyethyl methacrylate, polyacrylamide, polyacrylonitrile, butyl acrylate-styrene copolymers, butyl acrylate-acrylonitrile copolymers, butyl acrylate-acrylonitrile-glycidyl methacrylate copolymers, isobutylene-based soft polymers such as polyisobutylene, isobutylene-isoprene rubber, isobutylene-styrene copolymers, diene-based soft polymers such as polybutadiene, polyisoprene, butadiene-styrene random copolymers, isoprene-styrene random copolymers, acrylonitrile-butadiene copolymers, acrylonitrile-butadiene-styrene copolymers, butadiene-styrene-block copolymers, styrene-butadiene-styrene-block copolymers, isoprene-styrene-block copolymers, styrene-isoprene-styrene-block copolymers, silicon-based soft polymers such as dimethylpolysiloxane, diphenylpolysiloxane, dihydroxypolysiloxane, olefin-based soft polymers such as liquid polyethylene, polypropylene, poly-1-butene, ethylene-α-olefin copolymers, propylene-α-olefin copolymers, ethylene-propylene-diene copolymers (EPDM), ethylene-propylene-styrene copolymers, vinyl-based soft polymers such as polyvinyl alcohol, polyvinyl acetate, polyvinyl stearate, vinyl acetate-styrene copolymers, epoxy-based soft polymers such as polyethylene oxide, polypropylene oxide, epichlorohydrin rubbers, fluorine containing soft polymers such as vinylidene fluoride-based rubbers, tetrafluoroethylene-propylene rubbers, other soft polymers such as natural rubbers, polypeptides, proteins, polyester-based thermoplastic elastomers, vinyl chloride-based thermoplastic elastomers, polyamide-based thermoplastic elastomers, poly(2-methoxyethoxyethoxyethylene), styrene butadiene rubber (SBR), butadiene-acrylonitrile, rubber (NBR), hydrogenated NBR (HNBR), epichlorhydrin rubber (CHR) and acrylate rubber (ACM).

The binder material can be a soft polymer comprising at least one selected from the group consisting of soft polymers having a crosslinked structure, and soft polymers having a functional group in the range of about 3-12% by weight of the soft polymer, wherein the functional group is at least one selected from the group consisting of an unsaturated group, a carboxyl group, a hydroxy group, an amino group, and an epoxy group.

The binder materials can comprise at least one selected from the group consisting of copolymers of vinylidene fluoride and hexafluoropropylene, poly(methyl methacrylate)(PMMA), polyacrylic acids, polyacrylronitrile (PAN), polyvinyl chloride (PVC), poly vinylalcohols (PVA), polyvinyl pyrrolidone, polyethylene oxides (PEO), polyethylene glycols, polyacrylamide (PAAm), poly-N-isopropylearylamide, poly-N,N-dimethylacrylamide, polyethyleneimine, polyoxyethylene, polyvinylsulfonic acid, polyactic acid (PLA), polyacrylic acid (PAA), polysuccinic acid, poly maleic acid and anhydride, poly furoic(pyromucic acid), poly fumaric acid, poly sorbic acid, poly linoleic acid, poly linolenic acid, poly glutamic acid, poly methacrylic acid, poly licanic acid, poly glycolic acid, polyaspartic acid, poly amic acid, poly formic acid, poly acetic acid, poly propionic acid, poly butyric acid, poly sebacic acid, acrylic acid-type water-soluble polymers, maleicanhydride-type water-soluble polymers, poly(N-vinyl amides), polyacrylamides, N-methylacrylamide, N-ethyl acrylamide, N,N-dimethyl acrylamide, and N,Ndiethylacrylamide, poly(hydroxy-ethyl methacrylate), polyesters, poly(ethyl oxazolines), poly (oxymethylene), poly(vinyl methyl ether), poly(styrene sulfonic acid), poly(ethylenesulfonic acid), poly(vinyl phosphoric) acid, poly(maleic acid), starch, cellulose, protein, polysaccharide, dextrans, tannin, lignin, polyethylene-polypropylene copolymer, copolymers of poly(acrylonitrile-co-acrylamide), co-polymer of polystyrenebutadiene rubber and poly(acrylonitrile-co-acrylamide), or mixtures or co-polymers thereof, carboxymethyl cellulose (CMC), poly vinylalcohols (PVA), polyacrylic acids (PAA), polystyrenebutadiene rubber (SBR), PEO, or co-polymers of polyacrylonitrile, polyethylene oxides (PEO) and polyacrylamide (PAAm), poly vinylalcohols (PVA) and polyacrylamide (PAAm), or PEO and polyacrylronitrile (PAN), or co-polymers or mixtures thereof.

A soft polymer binder which does not contain fluorine, for example SBR, can have certain advantages. The avoidance of fluorine in the soft polymer can help to prevent the concentrated heat evolution and the capacity reduction of the battery caused by the reaction of the fluorine with the Li metal or Li ion. The use of nonfluoropolymer binder can also increase the cycle life of the LIB.

The soft polymer of the invention such as SBR can possess higher flexibility, stronger binding force, and higher heat resistance than the widely used PVDF. Its mechanical properties can be adjusted by the ratio of styrene monomer to the butadiene monomer: the higher the styrene content, the higher its rigidity. Furthermore, the swelling of the SBR with the electrolyte is low.

It is preferable that the binder should exhibit good chemical and electrochemical stability, as will be appreciated by one having ordinary skill in the art. It is desirable that the slurry, containing the binder, exhibit these characteristics in order to both properly bind the slurry to the current collectors—in order to improve adhesion of the slurry from the current collectors—and to maximize the electrochemical connection in the slurry between molecules of the electrode active material.

The selected binder polymer should have good flexibility and adhesion characteristics once the electrode free standing sheet, including the binder, has been laminated on current collector. Acceptable binders will provide electrode composite sheets and electrodes that will pass the Mandrel Test, which is known in the coating industry. In the embodiment of this test which was employed in the present invention, the free standing electrode sheet or coated electrode is wrapped around a cylinder having a diameter of 20 mm. If the coating does not visibly crack or delaminate when this test is performed, the coating is considered to "pass" the Mandrel Test. If the coating does visibly crack or delaminate when this test is performed, the electrode composite sheet or electrode is considered to "fail" the Mandrel Test and the binder is unacceptable. Whether a pass or a fail result is achieved on the Mandrel Test is a direct function of the characteristics of the polymer binder that has been included in the electrode active material. In this way, suitable binder polymer(s) having the desired flexibility characteristics can be identified.

In order to measure adhesion characteristics, ASTM standard test D3359-09e2, entitled Standard Test Methods for Measuring Adhesion by Tape Test, is used to measure whether the selected binder displays the requisite adhesion characteristics once laminated onto the electrode layers. As employed, this test involves placing a piece of Scotch® tape on the surface of a laminated electrode for 10 seconds, then removing the piece of tape at a medium rate from the surface of the electrode. If more than 90 percent of the coating material remains on the electrode layer after the adhesive tape has been removed, this indicates a "pass" result for the adhesion test. Otherwise, a "fail" result for the adhesion test is indicated. In this way, suitable binder polymer(s) having the desired adhesion characteristics can be identified. The percentage of coating material that remains on the electrode layer may be analyzed by analyzing a photographic image of the electrode layer or adhesive tape and calculating the quantity of coating material that is present based on a percentage of the total surface area of the electrode layer or adhesive tape.

The mixing step can be performed by any suitable process or apparatus. The mixing process can comprise at least one selected from the group consisting of rubber kneading, two roll milling, tumbling mixing, air jet mixing, mixture grinding, high-shear mixing, V-blender mixing, mixing by a screw-driven mass mixer, double-cone mixing, drum mixing, conical mixing, two-dimensional mixing, double Z-arm blending, ball-milling, and fluidized-bed blending.

The mixing step can further comprise the step of providing a solvent and mixing the solvent with the binder at a binder to solvent ratio of from 100:1 to 1:100 by weight, and adding the active material particles and carbonaceous conductors to binder solution in a ratio of from 10:1 to 1:10, by weight. Any ratio or range of ratios between these values is possible.

The solvent if present can be any suitable solvent. The solvent can comprises at least one selected from the group consisting of a hydrocarbon, ketone, naphtha, acetate, acrylonitrile, toluene, xylene, alcohol, or esters.

The selected solvent can have the capability to activate or modify the viscoelasticity of the selected binder to thicken the powder mixture, so that the binder improves its adhesion strength upon interacting with the solvent. The solvent also needs to be highly vaporizable such that no follow on drying process is necessary to remove the solvent afterwards. Examples may be hydrocarbons, low boiling point solvents, acetates, alcohols, acetone, ethanol, methanol, and the like.

The weight percentage of the active material, conductive material additive, and polymer binder based on the total weight of the electrode composite can vary. The active material can be 70, 71, 72, 73, 74, 75, 76, 77, 78, 79, 80, 81, 82, 83, 84, 85 86, 87, 88, 89, 90, 91, 92, 93, 94, 95, 96, 97 or 98 wt %. The conductive material additive can be 0, 1, 2, 3, 4, 5, 6, 7, 8, 9, or 10 wt %. The polymer binder can be 2, 3, 4, 5, 6, 7, 8, 9, 10, 11, 12, 13, 14, 15, 16, 17, 18, 19, or 20 wt %. The active material, conductive material additive, and polymer binder can be within ranges of any high or low value of these values.

The compressing step can include the step of passing the electrode composite through a pair of opposing rollers. The electrode composite sheet can be passed through a plurality of pairs of rollers. Multiple passes through the rollers can be made. The spacing between the rollers can be decreased for each subsequent pair of rollers.

The electrode composite sheet can have a thickness of less than 200 microns. The electrode composite sheet can have a thickness of from 50-150 microns. If solvent has been used some of it may be removed by the compression. The free-standing electrode composite sheet can have less than 1, 2, 3, 4, 5, 6, 7, 8, 9, 10, 20, 30, 40 or 50% solvent, by weight of the electrode composite sheet, or a range of any high or low value of these values. The mechanical tension of the resulting electrode composite sheet can be at least 0.5 MPa to permit winding of the sheet.

An electrode according to an aspect of the invention includes a current collector. An electrode composite comprises from 70-98% active material, from 0-10% conductive material additives, and from 2-20% polymer binder, based on the total weight of the electrode composite. The electrode composite is formed into an electrode composite sheet. The electrode composite sheet is adhered to the current collector to form the electrode. The electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The polymer binder can be a single nonfluoropolymer binder.

The step of performing a film making step by pressing the mixed materials into a sheet, includes pressing the mixed materials into a free standing film. The step of laminating the sheet or film includes lamination on to a current collector to form the electrode.

While the process methods can vary, one example of the process steps of the present invention includes the following, wherein all percentages below equal a weight percent:

Electrode composites can be made by a solvent free procedure. The materials are blended together using rubber kneading or a two roll mill to form a uniform mixture, including active materials, conductive material additives, and the binder. The working ranges for each include 70-98% for the active materials, 0-10% for the conductive material additives, and 2-20% binder material. Optimal ranges include 80-97% for the active materials, 0-5% for the conductive material additives and 3-15% for the binder material. No solvent is included.

Electrode composites can be made using a solvent-assistant procedure. In the step of obtaining a slurry, the method for dispersing the active materials, conductive material additives in the binder solution is not specifically limited. A slurry in which active materials, conductive material additives, and binder is highly dispersed can be obtained irrespective of the method for dispersing and the order of addition. As a device used for dispersing the active materials, conductive material additives in the binder composition, for example, mixing apparatuses of a stirring type, a shaking type and a rotary type, and the like can be used. Alternatively, dispersion kneader devices such as a corn mill, a colloid mill, a homogenizer, a ball mill, a sand mill, a roll mill, a planetary mixer and a planetary kneader can also be used. In using the mixing device and dispersion kneader device, in the case when a circumferential velocity can be defined, the circumferential velocity is preferably 4 to 50 m/s, more preferably 5 to 50 m/s, further preferably 10 to 40 m/s. When the circumferential velocity is too fast, the bubbling of the slurry and the pulverization of the non-conductive microparticles occur. When the circumferential velocity is too slow, the dispersibility of the non-conductive microparticles in the slurry is deteriorated. The slurry is dried by spray, jet mixing, fluidized bed or a combination thereof. The working ranges for each include 70-98% for the active materials, 0-10% for the conductive material additives, and 2-20% binder material. The optimal ranges include 80-97% for the active materials, 0-5% for the conductive material additives and 3-15% for the binder material.

The electrode composites are blended in a high speed mixer to cover the surface of the active materials and form ready-for-press electrode powders. Small amounts of solvent may be added into the mixture during high speed mixing to thicken the powders. The working range for solvent added includes 10-50% solvent. The optimal range for solvent added is 20-40%, by weight of the total mixture.

The mixed materials are then pressed into a sheet or a free standing film. The sheet or film is calendered onto a treated/or non-treated current collector to form the electrode.

Example #1

An anode composite mixture was prepared first by dissolving SBR polymer binder in ethyl acetate. The amount of binder relative to the amount of ethyl acetate was in the range of approximately 5 to 10 percent. An anode active powder (graphite) with an appropriate amount of conductive additive material, such as for example Super P®, were mixed with the binder solution. The homogeneously mixed electrode composite was then dried. The anode electrode composite can be further blended in a high speed mixer to form ready-for-press electrode powders. The mixed powders are pressed into a sheet or a free standing film through the gap between two rollers of a roll-mill. The electrode film is laminated by any suitable process onto a treated/or non-treated current collector to form the electrode at raised temperature.

Example #2

An anode composite mixture was prepared first by mixing active materials (hard carbon), conductive additive (acetylene black) and binder (NBR) in rubber internal mixer (Banbury mixer). A homogeneously mixed electrode composite was formed. The anode electrode composite was further blended in a high speed mixer to form ready-for-press electrode powders. The above mixed powder was pressed into a sheet or a free standing film through the gap between two rollers of a roll-mill. The electrode film was laminated onto a treated/or non-treated current collector to form the electrode at raised temperature.

Example #3

A cathode composite mixture was prepared first by mixing active materials ($LiFePO_4$), conductive additive (acetylene black) and binder (polyacrylate (ACM) elastomers) in a rubber two-roller mill. A homogeneously mixed electrode composite was formed. The cathode electrode composite was further blended in a high speed mixer to form ready-for-press electrode powders. The above mixed powder was pressed into a sheet or a free standing film through the gap between two rollers of a roll-mill. The electrode film was laminated onto a treated/or non-treated current collector to form the electrode at raised temperature.

A binder system for the fabrication of an electrode comprising active materials and a current collector can include a first lithium ion transporting polymeric coating binder material for coating the active materials to produce a first binder coated active material composite. A second polymeric binder material binds the coated first binder coated active material composites together and to the current collector. The electrode when formed possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test. The ratio of the first polymeric binder material to the second polymeric binder material is between 1:20 and 20:1 by weight.

An electrode according to the invention can include a first lithium ion transporting polymeric coating binder material which coats the active materials to provide a first binder coated active material composite. A second polymeric binder material binds the first binder coated active material composites together and to the current collector. The electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test.

The coating binder provides an electrode binder hybrid system for dry process electrode fabrication for lithium-ion batteries (LIBs). The binder hybrids include at least two materials comprising a polymeric material (binder 1) e.g. polvinylidenedifluoride (PVDF) that forms a coating on active material particle surface to improve lithium ion transport from electrolyte to active materials with suitable binding and coating characteristics and soft polymer binder (binder 2) e.g. a styrene-butadiene (SBR) binder that provides strong adhesion both to the electrode active material and the current collector. The binder materials can be different chemical components. A mixture ratio of the coating binder 1 and the binder 2 are selected within a range of 5:95 to 95:5 wt %. It is preferable that the coating binder 1 and the binder 2 are mixed within a rate of 20:80 to 80:20 wt %. This invention will provide a new way to achieve equivalent or improved results at a much reduced cost of dry process electrode fabrication for a lithium-ion battery.

The coating binders of the invention can comprise a polymeric material (binder 1) such as polvinylidenedifluoride (PVDF) that form a coating on the active material particle surface to improve lithium ion transport from electrolyte to active materials with suitable binding and coating characteristics and soft polymer binder (binder 2) such as a styrene-butadiene (SBR) binder that provides strong adhesion both to the electrode active material and the current collector. The materials have the different chemical component as each other with combination of both ion transport and mechanical binding capabilities.

A process for making an electrode can include the step of coating electrode active materials with a first lithium ion transporting polymeric coating binder material to produce a first binder coated active material composite. The coated electrode active materials are mixed with a second polymeric binder material for binding the first binder coated active material composite together and to a current collector. The mixture is thermally treated to provide an electrode film. The electrode film is applied to a current collector. The electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test.

The coating binder polymer is in direct contact with the active material particles in electrode, such that the ion exchange between the active material and the coating binder polymer would promote Li ion transport between the active material and the electrolyte solution. Another advantage of this invention is that the process also promotes direct and more contact between the active material particles or the conductive material and active material particles due to higher packing density, thus promoting the potential for greater electrical conduction inside the electrode. A further advantage of this invention is that the process results in energy storage devices with significantly higher power because less binder is used which significantly reduces the blocking of electrical flow between the particles.

The invention provides a more efficient manufacturing method of making high performance, high reliability/long field life and cost effective electrodes for LIBs. The current invention using the binder system contains at least two binders, comprising one binder forming a coating on the active material particle surface to improve lithium ion transport from electrolyte to active materials with suitable binding and coating characteristics and the other binder that provides strong adhesion both to the electrode active material and the current collector. The ready-to-press electrode composites powder is formed by mixing active material particles and conductive material particles by high speed mixing. The electrode powders are then pressed together to form a free-standing electrode film which is then laminated on to current collector. High performance and cost effective products, such as free-standing electrode films, laminated electrodes, lithium ion batteries can be manufactured.

The binder material can comprise at least two binder materials. The method can further include the step of forming a binder coating of a Li ion transporting material on the surface of the active materials. The binders have good Li ion transport, adhesion, high capacity and cycle life characteristics.

The coating binder materials can be at least one selected from the group consisting of homopolymers and copolymers of polyvinylidenefluoride (PVDF), polyolefinic materials with electron withdrawing substituents, and water soluble binders.

The coating binder can be selected from homopolymers and copolymers of polyvinylidene fluoride (PVDF), which have gained success as binders for cathodes and anodes in lithium ion battery technology. Copolymers such as p(VDF-HFP) (copolymer of vinylidene fluoride and hexafluoropropylene) can also be used. The coating binder has ion transport properties, in addition to PVDF, can be selected from polyolefinic materials with electron withdrawing substituents such as poly(methyl methacrylate)(PMMA), polyacrylic acids, polyacrylronitrile (PAN) and polyvinyl chloride (PVC).

Suitable water soluble coating binders include poly vinyl alcohols (PVA), polyvinyl pyrrolidone, polyethylene oxides (PEO), polyethylene glycols, polyacrylamide (PAAm), poly-N-isopropylearylamide, poly-N,N-dimethylacrylamide, polyethyleneimine, polyoxyethylene, polyvinylsulfonic acid, polyactic acid (PLA), polyacrylic acid (PAA), polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propoionic acid, poly butyric acid, poly sebacic acid, acrylic acid-type water-soluble polymers, maleic anhydride-type water-soluble polymers, poly(N-vinyl amides), polyacrylamides, for example N-methylacrylamide, N-ethyl acrylamide, N,N-dimethylacrylamide, and N,N-diethyl acrylamide, poly(hydroxy-ethyl methacrylate), polyesters, poly(ethyl oxazolines), poly(oxymethylene), poly(vinyl methyl ether), poly(styrene sulfonic acid), poly(ethylene sulfonic acid), poly(vinyl phosphoric) acid, poly(maleic acid), starch, cellulose, protein, polysacchride, dextrans, tannin, lignin, a polyethylene-polypropylene copolymer, copolymer poly(acrylonitrile-co-acrylamide), co-polymer of polystyrenebutadiene rubber and poly(acrylonitrile-co-acrylamide) or mixtures or co-polymers thereof. The polymer binder may also comprise physically- and/or chemically-modified versions of any of the polymer binders listed above. Preferred water-soluble binders may include CMC, PVA, PAA, physically and/or chemically-modified SBR, PEO, or co-polymers of PAN and polyacrylonitrile, PEO and PAAm, PVA and PAAm, or co-polymers or mixtures thereof, for example a physical blend (mixture) and/or co-polymers of the polymers mentioned above. One having ordinary skill in the art will appreciate that the above list of suitable polymers and co-polymers is exemplary only, and is not intended to limit the scope of the present invention.

While the process methods can vary, one example of the process steps of the present invention includes the following, wherein all percentages below equal a weight percent:

A binder coating is formed on the surface of active electrode materials with Li ion transport functionality, wherein the coating binder is 1-5% of the coating binder and active material total. The binder was first dissolved in the desired solvent in range of approximately 1-10%. A certain amount of active material particles is added to the solution and mixed thoroughly. The solvent will be evaporated to leave a thin layer binder coated on active particles. The active materials can be provided as particles which are covered on all sides by the coating binder. At least 50, 60, 70, 80, or 90%, or all of the surface area of the actives can be covered by the coating binder.

Electrode composites can be made by a solvent free procedure. All of the materials are blended together using a rubber knead or two roll mill to form uniform mixtures, including active materials, conductive material additives, and the binder. The working ranges for each include 70-98% for the active materials, 0-10% for the conductive material additives, and 2-20% binder material. The optimal ranges include 80-97% for the active materials, 0-5% for the conductive material additives and 3-15% for the binder material.

Electrode composites can also be made using a solvent-assist procedure. In the step of obtaining a slurry, the method for dispersing the active materials with coating, conductive material additives in the binder solution is not specifically limited. If the actives are coated with a coating binder, the selected solvent should not dissolve the coating. A slurry in which active materials, conductive material additives, and binder is highly dispersed can be obtained irrespective of the method for dispersing and the order of addition. As a device used for dispersing the active materials, conductive material additives in the binder composition, for example, mixing apparatus of a stirring type, a shaking type and a rotary type, and the like can be used. Alternatively, dispersion kneader devices such as a corn mill, a colloid mill, a homogenizer, a ball mill, a sand mill, a roll mill, a planetary mixer and a planetary kneader can also be used. In using the mixing device and dispersion kneader device, in the case when a circumferential velocity can be defined, the circumferential velocity is preferably 4 to 50 m/s, more preferably 5 to 50 m/s, further preferably 10 to 40 m/s. When the circumferential velocity is too fast, the bubbling of the slurry and the pulverization of the non-conductive microparticles occur.

When the circumferential velocity is too slow, the dispersability of the non-conductive microparticles in the slurry is deteriorated. The slurry is dried by spray, jet mixing, fluidized bed or a combination thereof. The working ranges for each include 70-98% for the active materials, 0-10% for the conductive material additives and 2-20% binder material. The optimal ranges include 80-97% for the active materials, 0-5% for the conductive material additives and 3-15% for the binder material.

The electrode composite powders are formed. The electrode composite material is blended in a high speed mixer to cover the surface of active materials and form ready-for-press electrode powders. Small amounts of solvent may be added into the mixture during high speed mixing to thicken the powders. The working range for solvent added includes 10-50% solvent. The optimal range for solvent added is 20-40%.

The mixed materials were pressed into a sheet or a free standing film through the gap between two rollers of a roll-mill at a temperature from room temperature to 200° C.

The sheet or film was calendered onto a treated/or non-treated current collector to form the electrode through the gap between two roller of a roll-mill at a temperature from room temperature to 200° C.

Example #4

A thin layer of PVDF polymer is coated on the surface of anode (graphite) particles. For example, PVDF is dissolved in N-methylpyrrolidone (NMP) solvent to form a PVDF/NMP solution. A certain amount of graphite particles is added to the solution and mixed thoroughly.

The NMP was evaporated to leave PVDF coated graphite particles. The PVDF coated graphite particle ranges from 0.1-5% by weight to the graphite. The current result shows that from 0.75-3% of PVDF coating. A 1% PVDF coating by weight gave the best performance data.

The PVDF coated graphite particles were mixed with SBR binder in either organic solvent such as toluene to form a slurry or in rubber internal mixer (Banbury mixer). The SBR binder ranged from 1-10% by weight to the graphite. The current result shows that from 1-5% of SBR. A 3% SBR by weight gave the best performance data. Acetylene black and/or carbon fiber can be part of a conductive additive to add into the mixture. If an organic solvent is used to form slurry, the organic solvent should not dissolve the PVDF coating. For example, a toluene solvent may be used. The homogeneously slurry was dried to form a negative electrode composite. The anode electrode composite was further blended in a high speed mixer to form ready-for-press electrode powder. The above mixed powder was pressed into a sheet or a free standing film through the gap between two rollers of a roll-mill at desired temperature from room temperature to 200° C. The electrode film was laminated onto a treated/or non-treated current collector to form the electrode at raised temperature.

The SBR and PVDF do not mix, and PVDF does not dissolve in toluene. During the coating process, the PVDF remains on the surface of the graphite. The SBR is also phase separated from the PVDF on a micro-scale when the electrode is made. Upon the addition of electrolyte to the electrode assembly, the PVDF will uptake electrolyte and swell. This swelled PVDF layer is in connection with the active material particle surface. The electrolyte swelled PVDF provides a lithium-ion transition channel to move between the electrolyte and active material surface. This invention will overcome the lithium-ion blocking effect exerted by a SBR coating on active material surface in SBR only systems.

Example #5

A thin layer of PEO polymer is coated on the surface of cathode active material ($LiFePO_4$) particles. For example, PEO is dissolved in methanol solvent to form a PEO solution. $LiFePO_4$ particles are added to the solution and mixed thoroughly. The methanol will be evaporated to leave PEO coated $LiFePO_4$ particles. The PEO coated graphite particle ranges from 0.1-20% by weight to the graphite. The result shows that from 5-15% of PEO coating. A 10% PEO coating by weight gave the best performance data.

The PEO coated $LiFePO_4$ particles were mixed with SBR binder in either organic solvent such as toluene to form a slurry or in rubber two-roller mill (Banbury mixer). The SBR binder ranges from 1-10% by weight to the $LiFePO_4$. The current result shows that from 3-8% of SBR. A 5% SBR by weight gave the best performance data. Acetylene black and/or carbon fiber can be part of a conductive additive to add into the mixture. If an organic solvent is used to form slurry, the organic solvent should not dissolve the PEO coating. For example, a toluene solvent may be used. The homogeneously slurry was dried to form a cathode electrode composites. The cathode electrode composite was further blended in a high speed mixer to form ready-for-press electrode powder. The mixed powder was pressed into a sheet or a free standing film through the gap between two rollers of a roll-mill at desired temperature from room temperature to 200° C. Laminating the electrode film on to a treated/or non-treated current collector to form the electrode at raised temperature.

During the coating process, the PEO remains on the surface of the $LiFePO_4$. The SBR is also phase separated from the PEO on a micro-scale when the electrode is made. Upon the addition of electrolyte to the electrode assembly, the PEO will uptake electrolyte and swell. This swelled PEO layer is in connection with the active material particle surface. The electrolyte swelled PEO provides a lithium-ion transition channel to move between the electrolyte and active material surface. This will overcome the lithium-ion blocking effect exerted by a SBR coating on active material surface in SBR-only systems.

The electrode of the invention can be used in an energy storage system comprising system blocks and modules and further wherein at least one of said energy storage system blocks and modules includes said manufactured energy storage device which includes said manufactured electrode. The electrochemical energy storage device can be a lithium-ion cell, lithium metal anode cell, magnesium metal cell, magnesium-ion cell, supercapacitor, battery-capacitor hybrid cell, lithium-ion capacitor, surface-mediated cell, metal ion transfer cell, or hybrids or derivatives of these devices.

The cost of an electrode is determined by the combination of the cost of the materials and the cost of manufacture. Less raw material usage, cheaper raw materials, fewer manufacturing steps, less energy used in the manufacture process, high production through-put and high yield of the manufacturing process, are the main means to achieve a low cost energy storage product. The invention provides such a less expensive manufacturing approach by the provision of a dry method to make LIBs.

Electrodes made by the dry methods of the invention do not need a long dryer to dry and remove the solvent (such as NMP and water). The cost of heat energy and additional work space can be reduced. In addition, the solvent must be recovered as a volatile organic compound (VOC). NMP recovery involves significant capital expense since multiple condensers or distillation towers are needed, and its use adds to the cost of the coating line equipment in making it explosion proof. Low cost polymer binders, such as rubbers or elastomers, can be used in the invention to replace expensive fluoropolymer (PTFE) that is used in current dry methods.

This invention provides a new binder system combination and a new dry process electrode fabrication for further cost reduction and performance improvement through optimization of manufacturing schemes. The advantages of this new dry electrode fabrication method includes: (1) binder combinations with better Li ion transport, higher flexibility, stronger binding force, and higher heat resistance and will result in high power density and long cycle life of the cells; enough flexibility and mechanical tension for continuous rolling during electrode fabrication; (2) dry process electrodes with high tap density, which will result high energy density, low electrical contact resistance, and good cycle life; (3) cost reduction on dryer electricity consumption, and capital equipment expense on solvent recycling and volatile organic compound recovery.

Another advantage of the electrodes of the invention is the resulting energy storage devices have significantly longer life, since the solvent used in the process is a minimal amount and also the solvent selected is highly vaporizable, the residue solvent in the electrode is minimal to non-existent, especially if/when the electrode is subject to a vacuum heating in the device manufacture process which is widely used in the energy storage industry.

This invention can be embodied in other forms without departing from the spirit or essential attributes thereof, and accordingly reference should be made to the following claims to determine the scope of the invention.

We claim:

1. A method of making an electrode for an electrochemical cell, comprising the steps of:
providing an electrode composite comprising from 70-98% active material, from 0-10% conductive material additives, and from 2-20% polymer binder, based on the total weight of the electrode composite, said composite being devoid of polytetrafluoroethylene;
mixing the electrode composite, wherein the mixing step further comprises the step of providing a solvent for the binder and dissolving the binder in the solvent to provide a binder solution, and then adding the active material particles and conductive material additives to the binder solution in a ratio of from 10:1 to 1:5, by weight;
compressing the electrode composite into an electrode composite sheet;
applying the electrode composite sheet to a current collector with pressure to form an electrode, wherein the electrode possesses positive characteristics for adhesion according to ASTM standard test D3359-09e2, entitled Standard Test Methods for Measuring Adhesion by Tape Test, and wherein the electrode composite sheet and the electrode possess positive characteristics for flexibility according to the Mandrel Test.

2. The method of claim 1, wherein the binder is a single nonfluoropolymer binder.

3. The method of claim 1, wherein the active material comprises at least 80% by weight of the electrode composite.

4. The method of claim 1, wherein the active material is a positive electrode active material comprising at least one selected from the group consisting of $LiCoO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, where 0<x<0.8, $LiMn_2O_4$, $LiFePO_4$, $Li_2Mn_2O_4$, $LiNiCoAlO_2$, $LiNi_yCo_xM_zO$, where M=Mn, Al, Sn, In, Ga or Ti and 0.15<x<0.5, 0.5<y<0.8 and 0<z<0.15, $Li[Li_{(1-2y)/3}Ni_yMn_{(2-y)/3}]O_2$, $Li[Li_{(1-y)/3}Co_yMn_{(2-2y)/3}]O_2$ and $Li[Ni_yCo_{1-2y}Mn_y]O_2$, 0<y<0.5, $LiNiCoO_2 \cdot MnO_2$, lithium rich compounds $Li_{1+y}(Ni_{1/3}Co_{1/3}Mn_{1/3})_{1-y}O_2$, where y=x/(2+x) and x=0-0.33, and $xLi_2MnO_3(1-x)Li(NiCoMn)O_2$ and $Li_{(1+y)}(Ni_{0.5}Co_{0.2}Mn_{0.3})_{1-y}O_2$, where y=x/(2+x) and x=0-0.33, and $LiMPO_4$, where M is at least one selected from the group consisting of V, Cr, Mn, Fe, Co, and Ni.

5. The method of claim 1, wherein the active material is an anode active material comprising at least one selected from the group consisting of carbon, hard carbon, soft carbon, synthetic graphite, natural graphite, mesophase carbon microbeads, $SnO_2$, SnO, $TiO_2$, $Li_4Ti_5O_{12}$, $LiTi_2O_4$, $SiO_2$ and silicon.

6. The method of claim 1, wherein the conductive material additive comprises at least one selected from the group consisting of carbon black, acetylene black, carbon nanotube, carbon nanofiber, carbon fibers, coke, high surface area carbon, graphite, metal particles, and conducting polymer.

7. The method of claim 1, wherein the binder material is a soft polymer comprising at least one selected from the group consisting of acrylic-based soft polymers, isobutylene-based soft polymers, diene-based soft polymers, silicon-containing soft polymers, olefin-based soft polymers, vinyl-based soft polymers, epoxy-based soft polymers, fluorine-containing soft polymers, natural rubbers, polypeptides, proteins, polyester-based thermoplastic elastomers, vinyl chloride-based thermoplastic elastomers, and polyamide-based thermoplastic elastomers.

8. The method of claim 1, wherein the binder material is a soft polymer comprising at least one selected from the group consisting of homopolymers or copolymers of acrylic acid or methacrylic acid derivatives, polybutyl acrylate, polybutyl methacrylate, polyhydroxyethyl methacrylate, polyacrylamide, polyacrylonitrile, butyl acrylate-styrene copolymers, butyl acrylate-acrylonitrile copolymers, butyl acrylate-acrylonitrile-glycidyl methacrylate copolymers, polyisobutylene, isobutylene-isoprene rubber, isobutylene-styrene copolymers, polybutadiene, polyisoprene, butadiene-styrene random copolymers, isoprene-styrene random copolymers, acrylonitrile-butadiene copolymers, acrylonitrile-butadiene-styrene copolymers, butadiene-styrene-block copolymers, styrene-butadiene-styrene-block copolymers, isoprene-styrene-block copolymers, styrene-isoprene-styrene-block copolymers, di methylpolysiloxane, diphenylpolysiloxane, dihydroxypolysiloxane, liquid polyethylene, polypropylene, poly-1-butene, ethylene-α-olefin copolymers, propylene-α-olefin copolymers, ethylene-propylene-diene copolymers (EPDM), ethylene-propylene-styrene copolymers, polyvinyl alcohol, polyvinyl acetate, polyvinyl stearate, vinyl acetate-styrene copolymers, polyethylene oxide, polypropylene oxide, epichlorohydrin rubbers, vinylidene fluoride-based rubbers, tetrafluoroethylene-propylene rubbers, poly(2-methoxyethoxyethoxyethylene), styrene butadiene rubber (SBR), butadiene-acrylonitrile, rubber (NBR), hydrogenated NBR (HNBR), epichlorhydrin rubber (CHR) and acrylate rubber (ACM).

9. The method of claim 1, wherein the binder material comprises a polymer comprising at least one selected from the group consisting of polymers having a crosslinked structure, and polymers having a functional group in the range of about 3-12% by weight of the polymer, wherein the functional group is at least one selected from the group consisting of an unsaturated group, a carboxyl group, a hydroxy group, an amino group, and an epoxy group.

10. The method of claim 1, wherein the mixing step comprises at least one selected from the group consisting of rubber kneading, two roll milling, tumbling mixing, air jet mixing, mixture grinding, high-shear mixing, V-blender mixing, mixing by a screw-driven mass mixer, double-cone mixing, drum mixing, conical mixing, two-dimensional mixing, double Z-arm blending, ball-milling, and fluidized-bed blending.

11. The method of claim 1, wherein the solvent comprises at least one selected from the group consisting of a hydrocarbon, ketone, naphtha, acetate, acrylonitrile, toluene, xylene, alcohol, or esters.

12. The method of claim 1, wherein said electrode composite sheet has a thickness of less than 200 microns.

13. The method of claim 1, wherein said electrode composite sheet has a thickness of from 50-150 microns.

14. The method of claim 1, wherein the electrode composite sheet comprises less than 50% solvent, by weight of the electrode composite sheet.

15. The method of claim 1, wherein the binder material comprises at least two binder materials.

16. The method of claim 1, further comprising the step of forming a binder coating of a Li ion transporting binder material on the surface of the active materials.

17. The method of claim 16, wherein the Li ion transporting binder materials comprises at least one selected from the group consisting of homopolymers and copolymers of polyvinylidenefluoride (PVDF), polyolefinic materials with electron withdrawing substituents, and water soluble binders.

18. The method of claim 16, wherein the Li ion transporting binder material comprises at least one selected from the group consisting of copolymers of vinylidene fluoride and hexafluoropropylene, poly(methyl methacrylate) (PMMA), polyacrylic acids, polyacrylronitrile (PAN), polyvinyl chloride (PVC), poly vinylalcohols (PVA), polyvinyl pyrrolidone, polyethylene oxides (PEO), polyethylene glycols, polyacrylamide (PAAm), poly-N-isopropylearylamide, poly-N,N-dimethylacrylamide, polyethyleneimine, polyoxyethylene, polyvinylsulfonic acid, polylactic acid (PLA), polyacrylic acid (PAA), polysuccinic acid, poly maleic acid and anhydride, poly furoic(pyromucic acid), poly fumaric acid, poly sorbic acid, poly linoleic acid, poly linolenic acid, poly glutamic acid, poly methacrylic acid, poly licanic acid, poly glycolic acid, polyaspartic acid, poly amic acid, poly formic acid, poly acetic acid, poly propionic acid, poly butyric acid, poly sebacic acid, acrylic acid-type water-soluble polymers, maleicanhydride-type water-soluble polymers, poly(N-vinyl amides), polyacrylamides, N-methylacrylamide, N-ethyl acrylamide, N,N-dimethyl acrylamide, and N,Ndiethylacrylamide, poly(hydroxy-ethyl methacrylate), polyesters, poly(ethyl oxazolines), poly(oxymethylene), poly(vinyl methyl ether), poly(styrene sulfonic acid), poly(ethylenesulfonic acid), poly(vinyl phosphoric) acid, poly(maleic acid), starch, cellulose, protein, polysaccharide, dextrans, tannin, lignin, polyethylene-polypropylene copolymer, copolymers of poly(acrylonitrile-co-acrylamide), copolymer of polystyrenebutadiene rubber and poly(acrylonitrile-co-acrylamide), or mixtures or co-polymers thereof, carboxymethyl cellulose (CMC), poly vinylalcohols (PVA), polyacrylic acids (PAA), polystyrenebutadiene rubber (SBR), PEO, or co-polymers of polyacrylonitrile, polyethylene oxides (PEO) and polyacrylamide (PAAm), poly vinylalcohols (PVA) and polyacrylamide (PAAm), or PEO and polyacrylronitrile (PAN), or co-polymers or mixtures thereof.

19. The method of claim 16, wherein the Li ion transporting binder material is a soft polymer comprising at least one selected from the group consisting of homopolymers or copolymers of acrylic acid or methacrylic acid derivatives, polybutyl acrylate, polybutyl methacrylate, polyhydroxyethyl methacrylate, polyacrylamide, polyacrylonitrile, butyl acrylate-styrene copolymers, butyl acrylate-acrylonitrile copolymers, butyl acrylate-acrylonitrile-glycidyl methacrylate copolymers, polyisobutylene, isobutylene-isoprene rubber, isobutylene-styrene copolymers, polybutadiene, polyisoprene, butadiene-styrene random copolymers, isoprene-styrene random copolymers, acrylonitrile-butadiene copolymers, acrylonitrile-butadiene-styrene copolymers, butadiene-styrene-block copolymers, styrene-butadiene-styrene-block copolymers, isoprene-styrene-block copolymers, styrene-isoprene-styrene-block copolymers, dimethylpolysiloxane, diphenylpolysiloxane, dihydroxypolysiloxane, liquid polyethylene, polypropylene, poly-1-butene, ethylene-α-olefin copolymers, propylene-α-olefin copolymers, ethylene-propylene-diene copolymers (EPDM), ethylene-propylene-styrene copolymers, polyvinyl alcohol, polyvinyl acetate, polyvinyl stearate, vinyl acetate-styrene copolymers, polyethylene oxide, polypropylene oxide, epichlorohydrin rubbers, vinylidene fluoride-based rubbers, tetrafluoroethylene-propylene rubbers, poly(2-methoxyethoxyethoxyethylene), styrene butadiene rubber (SBR), butadiene-acrylonitrile, rubber (NBR), hydrogenated NBR (HNBR), epichlorhydrin rubber (CHR) and acrylate rubber (ACM).

20. The method of claim 1, wherein the compressing step comprises passing the electrode composite through a pair of opposing rollers.

21. The method of claim 20, wherein the electrode composite sheet is passed through a plurality of pairs of rollers, the spacing between the rollers decreasing for each subsequent pair of rollers.

* * * * *